United States Patent
Nguyen et al.

(10) Patent No.: US 8,265,042 B1
(45) Date of Patent: Sep. 11, 2012

(54) ETHERNET BACKHAUL ARCHITECTURE

(75) Inventors: Khoi Dinh Nguyen, Lenexa, KS (US);
Brian Dean Saunders, Lenexa, KS (US); Youssef Salim Rouphael, Olathe, KS (US); Adeel Siddiqui, Lansdowne, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 863 days.

(21) Appl. No.: 12/396,198

(22) Filed: Mar. 2, 2009

(51) Int. Cl.
*H04J 3/00* (2006.01)

(52) U.S. Cl. .......................... 370/336; 370/350; 370/503

(58) Field of Classification Search .................. 370/320, 370/328–339, 342, 441, 503–515; 375/354–355, 375/362; 713/400; 714/775, 776, 789
See application file for complete search history.

(56) References Cited

U.S. PATENT DOCUMENTS

| | | | |
|---|---|---|---|
| 2009/0161744 A1* | 6/2009 | Smith et al. | 375/226 |
| 2009/0276542 A1* | 11/2009 | Aweya et al. | 709/248 |
| 2010/0054232 A1* | 3/2010 | Asano | 370/349 |

OTHER PUBLICATIONS

RAD, Synchronization and Timing in Packet-Based Mobile Backhaul, RAD, 12 pages, 2009.*

* cited by examiner

*Primary Examiner* — Frank Duong

(57) ABSTRACT

A communication system for providing an accurate timing signal and synchronization information is described herein. The communication system comprises a Precision Time Protocol (PTP) server, a Global Positioning System (GPS), a pseudowire device, and a PTP client. The PTP client receives a time of day data and frequency information from the PTP server, receives a timing signal from the GPS, synchronizes the time of day data and timing signal to create synchronized a time of day signal, and provides the synchronized time of day signal to the pseudowire device. The pseudowire device processes the synchronized time of day signal and the frequency information to perform a time-division multiplexing signal to Ethernet signal synchronized conversion.

17 Claims, 5 Drawing Sheets

ETHERNET BACKHAUL ARCHITECTURE

TECHNICAL BACKGROUND

Backhaul is the means to transport wireless customer traffic from a radio access cell site to a Mobile Switching Center (MSC) or Worldwide Interoperability for Microwave Access (WiMAX) Service Center. Backhaul technologies include point-to-point microwave radio relay transmission, point-to-multipoint microwave access technologies (such as Local Multipoint Distribution Service (LMDS), WiFi, and WiMAX), digital subscriber line (DSL) variants (such as Asymmetric Digital Subscriber Line (ADSL) and Single-pair High-speed Digital Subscriber Line (SHDSL)), Plesiochronous Digital Hierarchy (PDH) and Synchronous Digital Hierarchy (SDH)/synchronous optical networking (SONET) interfaces (such as (fractional) E1/T1, E3, T3, and Synchronous Transport Module (STM)-1/Optical Carrier (OC)-3), IP (Internet Protocol)/MPLS (Multi-Protocol Label Switching), and Ethernet. Backhaul can be used as a facility pipe for multiplexing and transport of individual Radio Access Network circuits and connections. Additionally, backhaul capacity may be leased, in full or in part, from a third party service provider.

A packet network has inherent variability in timing and spacing between packets. Currently, measuring one way frame delay is accomplished by measuring the round trip delay and dividing by two. However, round trip delay does not take into account the asymmetrical paths that Ethernet uses. Also, the latency or delay from the MSC to the BTS (Base Transceiver Station) may be different than the latency in the opposite direction. Thus, it is possible that round trip delay divided by two will not yield an accurate one way frame delay measurement.

OVERVIEW

Generally, a communication system for providing an accurate timing signal and synchronization information is described herein. The communication system comprises a Precision Time Protocol (PTP) server, a Global Positioning System (GPS), a pseudowire device, and a PTP client. The PTP client receives a time of day data and frequency information from the PTP server, receives a timing signal from the GPS, synchronizes the time of day data and the timing signal to create a synchronized time of day signal, and provides the synchronized time of day signal and the frequency information to the pseudowire device. The pseudowire device processes the synchronized time of day signal and the frequency information to perform a time-division multiplexing signal to Ethernet signal synchronized conversion. A method of providing an accurate timing signal and synchronization information in a communication system is also described herein.

DETAILED DESCRIPTION

Included herein is a method and system for providing redundant timing and synchronization of packets transferred between a BTS and an MSC. Generally, a PTP client receives two separate timing signals—one from a GPS satellite and one from a PTP server. The PTP client then synchronizes the two timing signals to create an accurate time of day (ToD) signal. A pseudowire device then uses the ToD signal, as well as frequency information, to perform a time division multiplexing (TDM) signal to an Ethernet signal synchronized conversion.

Figure 1:
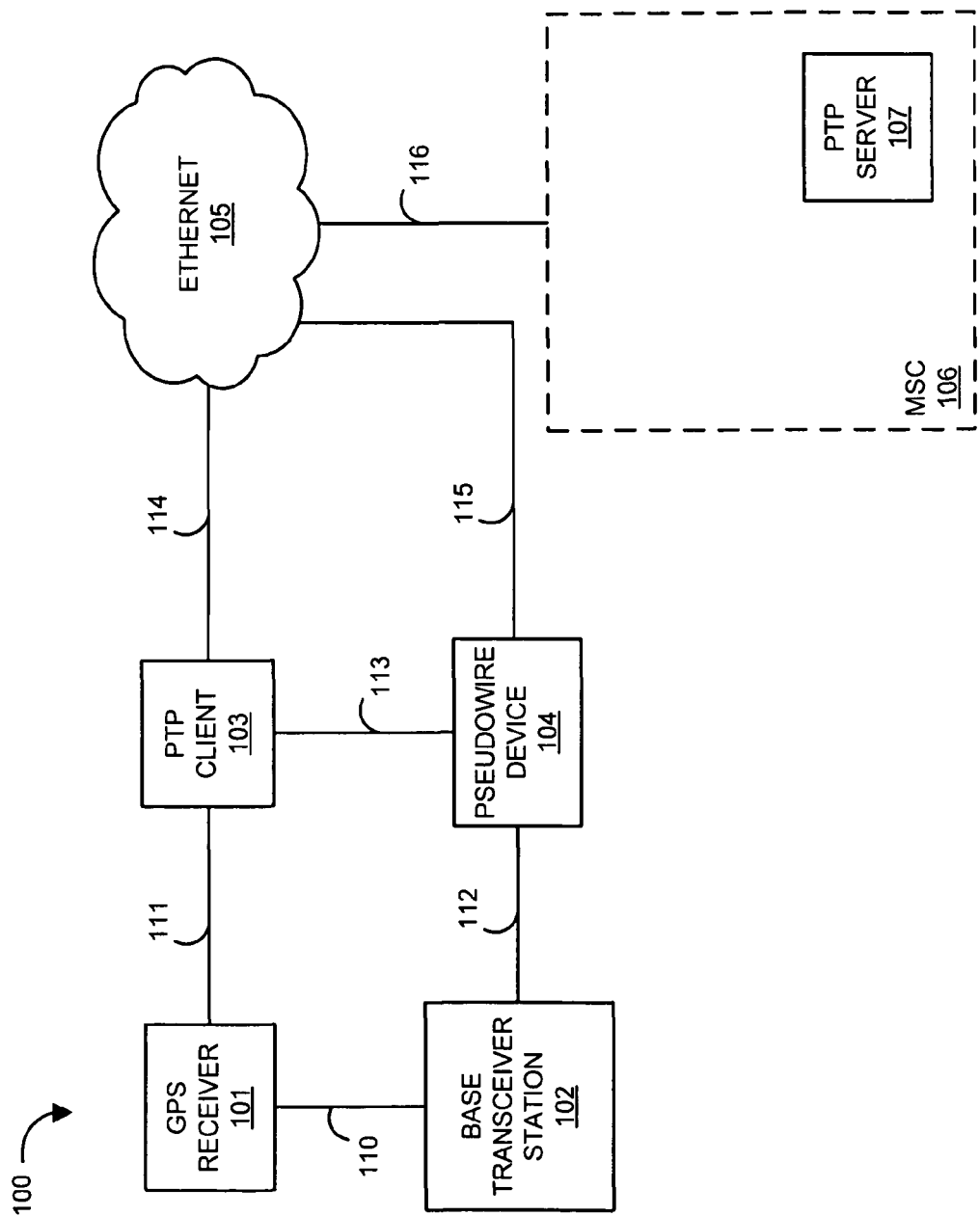
FIG. 1 is a block diagram illustrating communication system 100.

FIG. 1 is a block diagram illustrating communication system 100. Communication system 100 is configured to provide an accurate timing signal and synchronization information to pseudowire device 104. Communication system 100 includes Global Positioning System (GPS) receiver 101, base transceiver station 102, Precision Time Protocol (PTP) client 103, pseudowire device 104, Ethernet 105, mobile switching center (MSC) 106, and PTP server 107.

GPS receiver 101 comprises antennas and circuitry that receive microwave signals from a GPS satellite (not shown). The microwave signals enable GPS receiver 101 real-time access to the Coordinate Universal Time (UTC) timescale. GPS receiver 101 communicates with base transceiver station 102 over communication link 110. Additionally, GPS receiver 101 communicates with PTP client 103 over communication link 111.

Base transceiver station 102 comprises interfaces and circuitry that exchange communication signals between communication system 100 and wireless communication devices (not shown) such as mobile phones, hand-held media devices, and personal computers. Base transceiver station 102 communicates with GPS receiver 101 over communication link 110. Additionally, base station transceiver 102 communicates with pseudowire device 104 over communication link 112.

PTP client 103 comprises interfaces and circuitry that perform interface functions, for example, code conversion, protocol conversion, and buffering, required for communications to and from communication system 100. PTP client 103 communicates with GPS receiver 101 over communication link 111, with pseudowire device 104 over communication link 113, and with Ethernet 105 over communication link 114.

Pseudowire device 104 comprises interfaces and circuitry that emulate a native service over a packet switched network (PSN). For example, the native service could be time division multiplexing (TDM), Asynchronous Transfer Mode (ATM), or Frame Relay while the PSN could be Ethernet, Multi Protocol Label Switching (MPLS), or Internet Protocol (IP). Pseudowire device 104 communicates with base transceiver station 102 over communication link 112, with PTP client 103 over communication link 103, and with Ethernet 105 over communication link 115.

Ethernet 105 comprises a packet switch communications network that facilitates the transfer of communication signals in the form of packets. Ethernet communicates with PTP client 103 over communication link 114, with pseudowire device 104 over communication link 115, and with MSC 106 over communication link 116.

MSC 106 comprises interfaces and circuitry that provide services and coordination between mobile users in a network and external networks. MSC 106 communicates with Ethernet 105 over communication link 116. MSC 106 also contains PTP server 107. PTP server 107 comprises interfaces and circuitry that provide time of day (ToD) signals and frequency information to PTP client 103.

Communication links 110 and 111 comprise wired links, wireless links, or any combination or variation thereof. Communication link 112 comprises a wired T1 link. Communication links 113, 114, 115, and 116 comprise wired Ethernet links.

Figure 2:
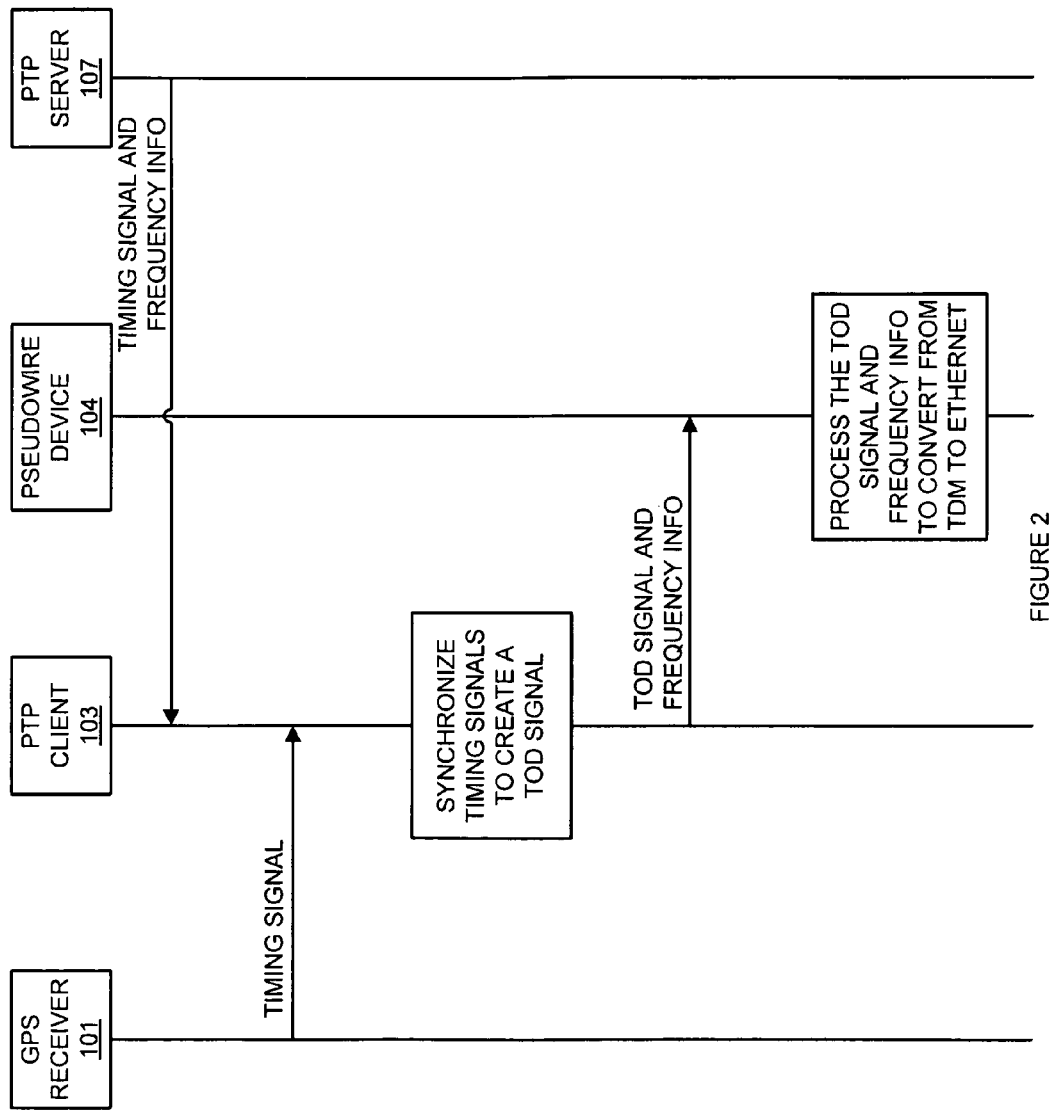
FIG. 2 is a flow diagram illustrating a method of providing an accurate timing signal and synchronization information in communication system 100.

FIG. 2 is a flow diagram illustrating a method of providing an accurate timing signal and synchronization information in communication system 100. In operation, PTP client 103 receives a timing signal (or ToD signal) and frequency information from PTP server 107. GPS receiver 101 also sends PTP client 103 a timing signal. For example, the timing signal sent from GPS receiver 101 could be a clocking signal generated by GPS receiver 101, which receives a raw GPS signal from a GPS satellite orbiting in space.

Upon receiving both timing signals, PTP client 103 synchronizes the two timing signals to create an accurate time of day (ToD) signal. PTP client 103 then provides the synchronized ToD signal and the frequency information, which was received from PTP server 107, to pseudowire device 104. Pseudowire device 104 processes the ToD signal and the frequency information in order to have the necessary information to perform a TDM signal to an Ethernet signal synchronized conversion. Additionally, pseudowire device 104 may also convert from SONET/SDH, ATM, Frame Relay, or Ethernet to MPLS or IP, or any combination thereof.

Figure 3:
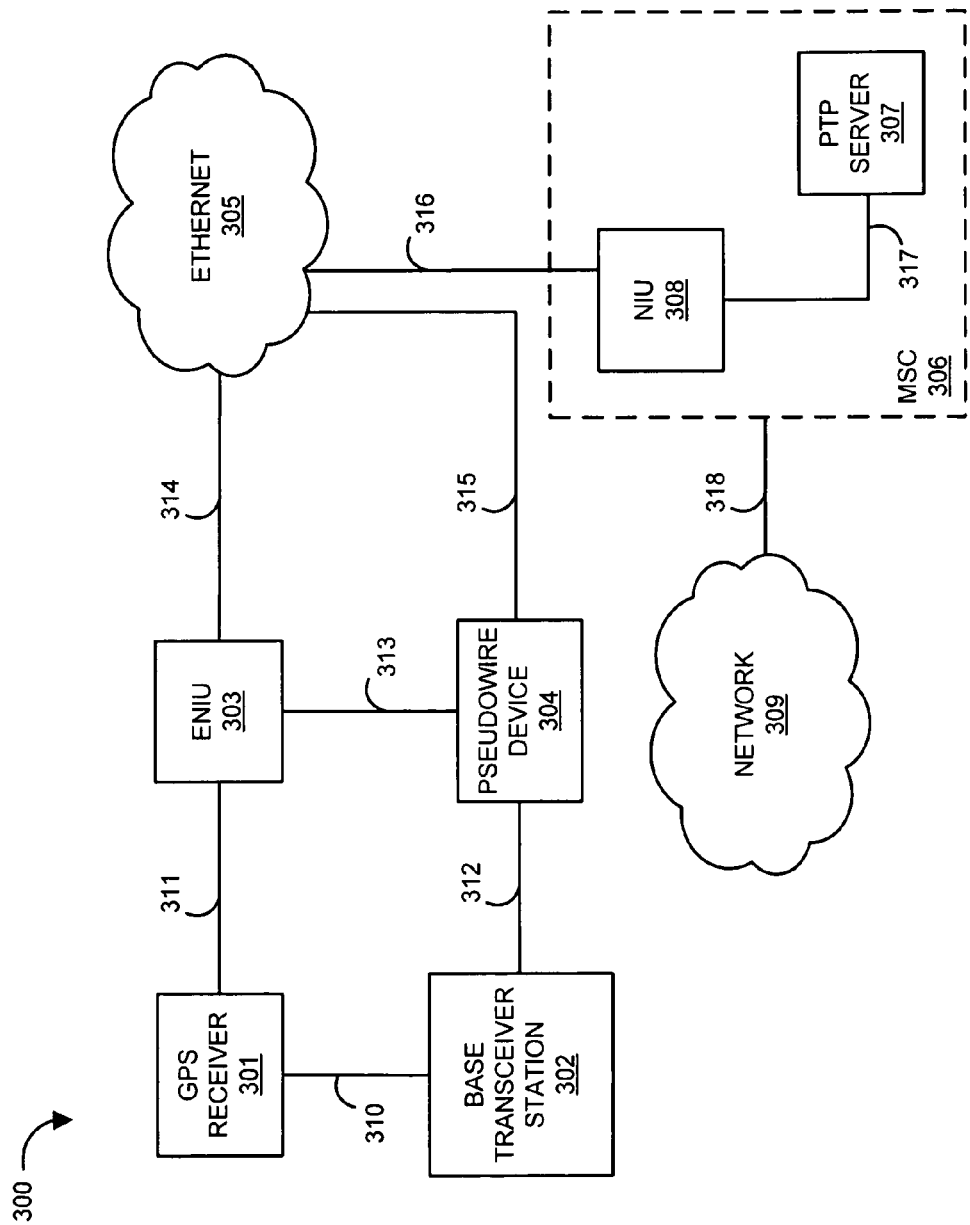
FIG. 3 is a block diagram illustrating communication system 300.

FIG. 3 is a block diagram illustrating communication system 300. Communication system 300 is configured to provide an accurate timing signal and synchronization information to pseudowire device 304. Communication system 300 includes GPS receiver 301, base transceiver station 302, Ethernet network interface unit (ENIU) 303, pseudowire device 304, Ethernet 305, MSC 306, PTP server 307, network interface unit (NIU) 308, and network 309.

GPS receiver 301 comprises antennas and circuitry that receive microwave signals from a GPS satellite (not shown). The microwave signals enable GPS receiver 301 real-time access to the UTC timescale. GPS receiver 301 communicates with base transceiver station 302 over communication link 310. Additionally, GPS receiver 301 communicates with ENIU 303 over communication link 311.

Base transceiver station 302 comprises interfaces and circuitry that exchange communication signals between communication system 300 and wireless communication devices (not shown) such as mobile phones, hand-held media devices, and personal computers. Base transceiver station 302 communicates with GPS receiver 301 over communication link 310. Additionally, base station transceiver 302 communicates with pseudowire device 304 over communication link 312.

ENIU 303 comprises interfaces and circuitry that perform interface functions, for example, code conversion, protocol conversion, and buffering, required for communications to and from communication system 300. ENIU 303 communicates with GPS receiver 301 over communication link 311, with pseudowire device 304 over communication link 313, and with Ethernet 305 over communication link 314.

Pseudowire device 304 comprises interfaces and circuitry that emulate a native service over a PSN. For example, the native service could be TDM, ATM, Frame Relay, or Ethernet while the PSN could be Ethernet, MPLS, or IP. Pseudowire device 304 could comprise any number of commercially available pseudowire devices, such as IPmux-16 TDM over IP Gateway from RAD Data Communications. Pseudowire device 304 communicates with base transceiver station 302 over communication link 312, with ENIU 303 over communication link 313, and with Ethernet 305 over communication link 315.

Ethernet 305 comprises a packet switch communications network that facilitates the transfer of communication signals in the form of packets. Ethernet communicates with ENIU 303 over communication link 314, with pseudowire device 304 over communication link 315, and with MSC 306 over communication link 316.

MSC 306 comprises interfaces and circuitry that provide services and coordination between mobile users in a network and external networks. MSC 306 communicates with CDMA network 309 over communication link 318. MSC 306 also contains PTP server 307 and NIU 308. PTP server 307 comprises interfaces and circuitry that provide ToD signals and frequency information to ENIU 303. PTP server 307 communicates with NIU 308 over communication link 317. NIU 308 comprises interfaces and circuitry that perform interface functions, for example, code conversion, protocol conversion, and buffering, required for communications to and from communication system 300. NIU 308 communicates with Ethernet 305 over communication link 316. NIU 308 also communicates with PTP server 307 over communication link 317.

Network 309 comprises a code division multiple access (CDMA) 1XRTT, CDMA2000 EVDO, a Worldwide Interoperability for Microwave Access (WiMAX), or Integrated Digital Enhanced Network (iDEN) network. Network 309 communicates with MSC 306 over communication link 318.

Communication links 310, 311, 313, 314, and 316-318 comprise wired links, wireless links, or any combination or variation thereof. Communication link 312 comprises a wired link, such as a T1 link. Communication link 312 may also comprise an ATM, Frame Relay, or Ethernet link. Communication link 315 comprises a wired link, such as an Ethernet link. Communication link 315 may also comprise a MPLS or IP link.

In an example communication system 300 could be used in an Ethernet backhaul architecture in a WiMAX, CDMA2000 1xRTT, CDMA2000 EVDO, or iDEN network. ENIU 303 and NIU 308 exchange communication signals through Ethernet 305 in order to monitor communication system 300 for fault management and performance monitoring. Additionally, ENIU 303 and NIU 308 run OAM protocols, which in turn, use the ITU-T Y.1731 standard. ENIU 303 and NIU 308 also contain built-in PTP clients.

OAM protocols generate messages that can be used to help identify problems in a network. The ITU-T Y.1731 standard covers two major areas—fault management and performance monitoring. Fault management encompasses fault detection, fault verification, fault isolation, and fault notification. Performance monitoring includes such measurements as packet loss, packet loss ratio, packet delay, and packet delay variation. In the above example, OAM performance monitoring signals are sent in a packet format that includes a time stamp. The packets are sent from NIU 308 to ENIU 303 and from ENIU 303 to NIU 308. Packets are sent both ways because each individual packet can suffer varying delays and even loss. The time stamps included in the packets can be used by ENIU 303 as a timing signal.

Figure 4:
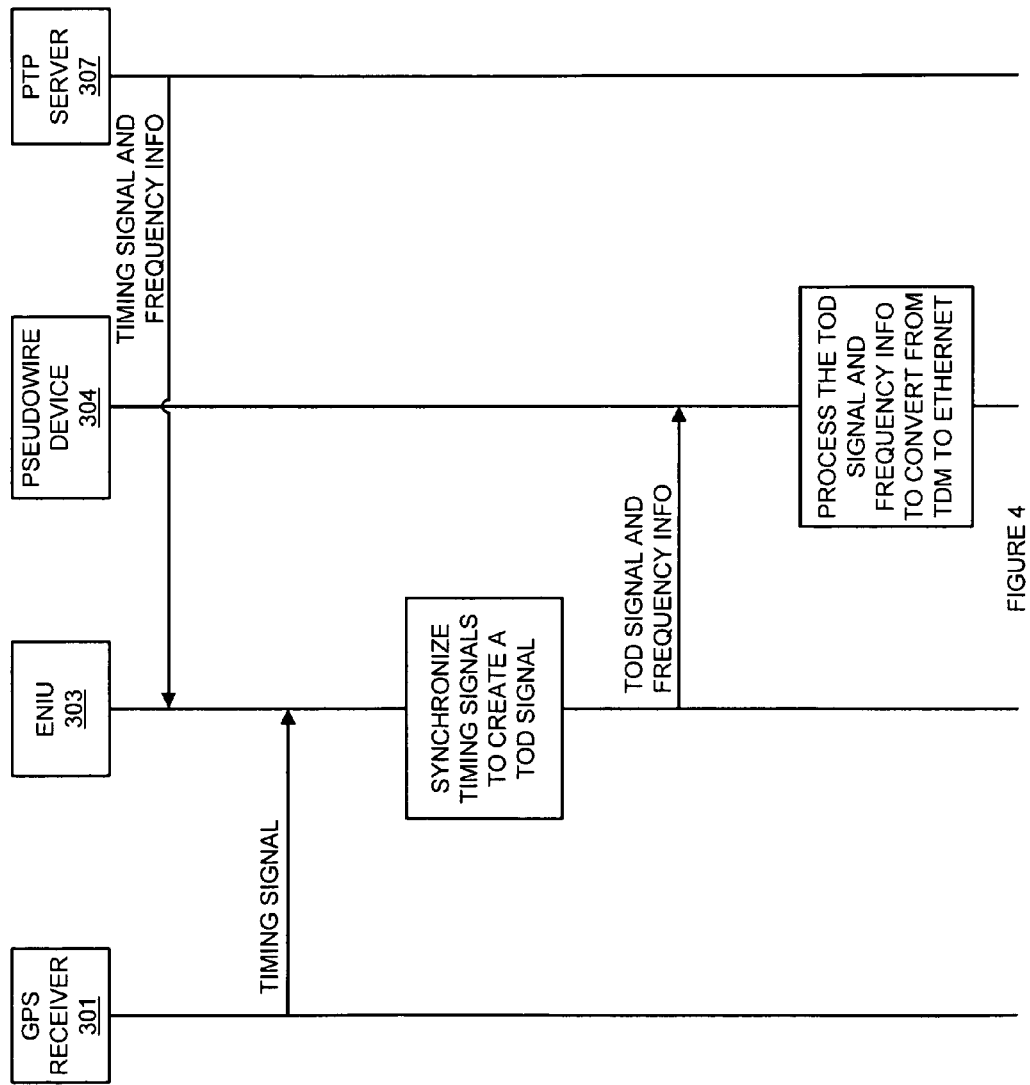
FIG. 4 is a flow diagram illustrating a method of providing an accurate timing signal and synchronization information in communication system 300.
Figure 5:
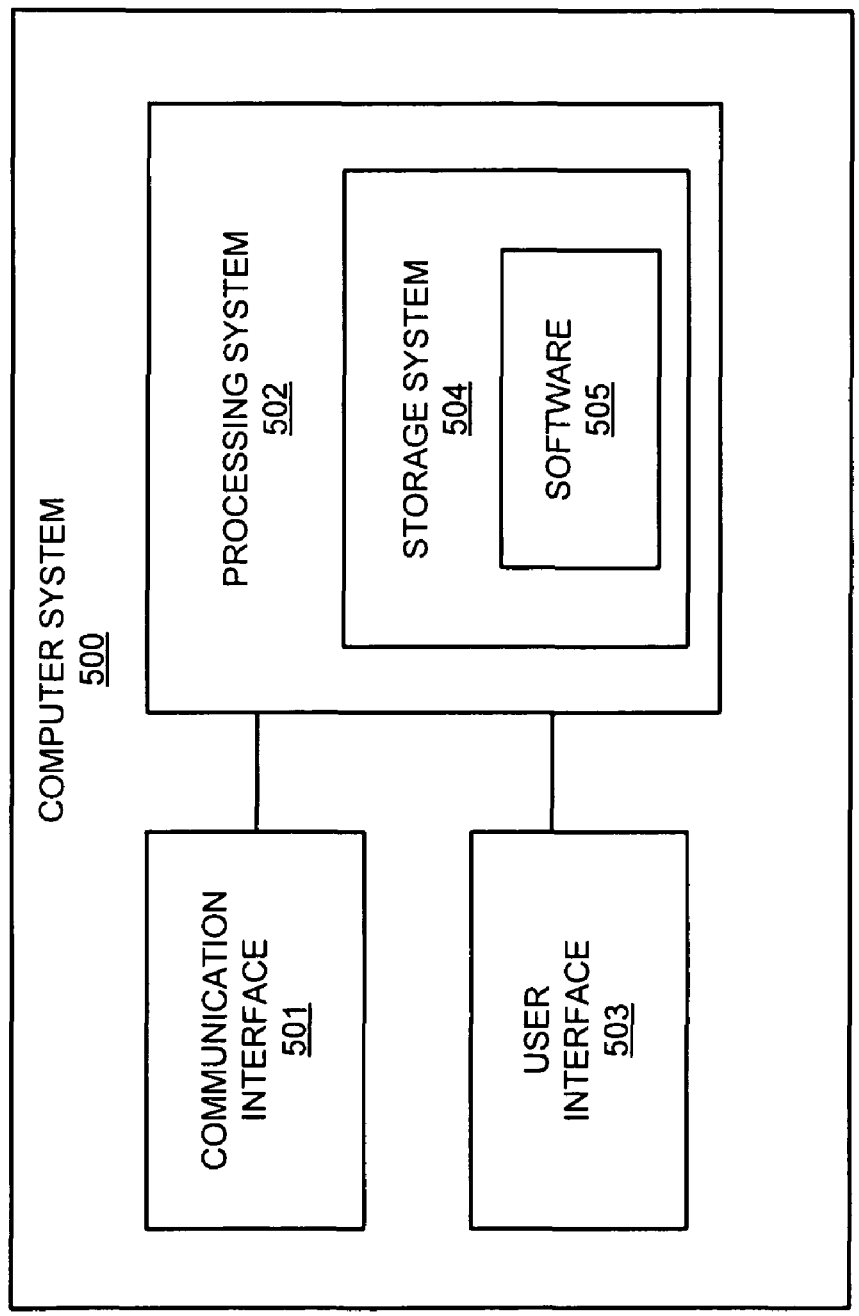
FIG. 5 is a block diagram illustrating computer system 500.

FIG. 4 is a flow diagram illustrating a method of providing an accurate timing signal and synchronization information in communication system 300. In operation, ENIU 303 receives a timing signal and frequency information from PTP server 307. For example, the timing signal may be part of an OAM testing signal. GPS receiver 301 also sends ENIU 303 a timing signal. For example, the timing signal could be a clocking signal generated by GPS receiver 301, which received a raw GPS signal from a GPS satellite orbiting in space.

Upon receiving both timing signals (the GPS timing signal and the PTP timing signal), ENIU 303 synchronizes the two timing signals to create an accurate ToD signal. ENIU 303 then provides the synchronized ToD signal and the frequency information, which was received from NIU 307, to pseudowire device 304. Pseudowire device 304 processes the ToD signal and the frequency information in order to have the necessary information to perform a TDM signal to an Ethernet signal synchronized conversion. Additionally, pseudowire device 304 may also convert from ATM, Frame Relay, or Ethernet to MPLS or IP.

Computer system 500 includes communication interface 501, processing system 502, and user interface 503. Processing system 502 includes storage system 504. Storage system 504 stores software 505. Processing system 502 is linked to communication interface 501 and user interface 503. Computer system 500 could be comprised of a programmed general-purpose computer, although those skilled in the art will appreciate that programmable or special purpose circuitry and equipment may be used. Computer system 500 may be distributed among multiple devices that together comprise elements 501-505.

Communication interface 501 could comprise a network interface, modem, port, transceiver, or some other communication device. Communication interface 501 may be distributed among multiple communication devices. Processing system 502 could comprise a computer microprocessor, logic circuit, or some other processing device. Processing system 502 may be distributed among multiple processing devices. User interface 503 could comprise a keyboard, mouse, voice recognition interface, microphone and speakers, graphical display, touch screen, or some other type of user device. User interface 503 may be distributed among multiple user devices. Storage system 504 could comprise a disk, tape, integrated circuit, server, or some other memory device. Storage system 504 may be distributed among multiple memory devices.

Processing system 502 retrieves and executes software 505 from storage system 504. Software 505 may comprise an operating system, utilities, drivers, networking software, and other software typically loaded onto a computer system. Software 505 could comprise an application program, firmware, or some other form of machine-readable processing instructions. When executed by processing system 502, software 505 directs processing system 502 to process the time of day signal and the frequency information to allow pseudowire devices 104 and 304 to perform a time-division multiplexing signal to Ethernet signal synchronized conversion.

Note communication systems 100 and 300 provide an Ethernet backhaul architecture that provides a redundant, failover enabled timing and synchronization mechanism utilizing a GPS sourced timing reference at the base transceiver station as well as the MSC. Additionally, the PTP timing mechanism is utilized in a redundant configuration to allow for fault failover as well as a verification reference.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system for providing an accurate timing signal and synchronization information, the communication system comprising:
    a precision time protocol server;
    a global positioning system;
    a pseudowire device; and
    a precision time protocol client, wherein the precision time protocol client receives a time of day data and frequency information from the precision time protocol server, receives a timing signal from the global position system, synchronizes the time of day data and the timing signal to create a synchronized time of day signal, and provides the synchronized time of day signal and the frequency information to the pseudowire device; and
    wherein the pseudowire device processes the synchronized time of day signal and the frequency information to perform a time-division multiplexing signal to Ethernet signal synchronized conversion.

2. The communication system for providing an accurate timing signal and synchronization information of claim 1 further comprising a mobile switching center, wherein the mobile switching center contains the precision time protocol server and a first network interface unit.

3. The communication system for providing an accurate timing signal and synchronization information of claim 1 wherein the precision time protocol client is a second network interface unit.

4. The communication system for providing an accurate timing signal and synchronization information of claim 1 wherein the timing signal is a pulse per second signal.

5. The communication system for providing an accurate timing signal and synchronization information of claim 2 wherein the MSC is in communication with a code division multiple access network.

6. The communication system for providing an accurate timing signal and synchronization information of claim 2 wherein the mobile switching center is in communication with a worldwide interoperability for microwave access network.

7. The communication system for providing an accurate timing signal and synchronization information of claim 2 wherein the first and second network interface units and the pseudowire device communicate with an Ethernet network.

8. The communication system for providing an accurate timing signal and synchronization information of claim 1 wherein the time of day data is an operations, administration, and maintenance testing signal.

9. A method of providing an accurate timing signal and synchronization information in a communication system, the method comprising:
    in a precision time protocol client, receiving a time of day data and frequency information from a precision time protocol server, receiving a timing signal from a global positioning system, synchronizing the time of day data and the timing signal to create a synchronized time of day signal, and providing the synchronized time of day signal and the frequency information to a pseudowire device; and
    in the pseudowire device, processing the synchronized time of day signal and the frequency information to perform a time-division multiplexing signal to Ethernet signal conversion.

10. The method of providing an accurate timing signal and synchronization information in a communication system of claim 9 further comprising a mobile switching center, wherein the mobile switching center contains the precision time protocol server and a first network interface unit.

11. The method of providing an accurate timing signal and synchronization information in a communication system of claim 9 wherein the precision time protocol client is a second network interface unit.

12. The method of providing an accurate timing signal and synchronization information in a communication system of claim 9 wherein the timing signal is a pulse per second signal.

13. The method of providing an accurate timing signal and synchronization information in a communication system of claim 10 wherein the mobile switching center is in communication with a code division multiple access network.

14. The method of providing an accurate timing signal and synchronization information in a communication system of claim 10 wherein the mobile switching center is in communication with a worldwide interoperability for microwave access network.

15. The method of providing an accurate timing signal and synchronization information in a communication system of claim 10 wherein the first and second network interface units and the pseudowire device communicate with an Ethernet network.

16. The method of providing an accurate timing signal and synchronization information in a communication system of claim 9 wherein the time of day data is an operations, administration, and maintenance testing signal.

17. A computer readable medium including a software product having instructions stored thereon for providing an accurate timing signal and synchronization information in a communication system, the instructions operational when executed by a computer to:
  direct a processor in a precision time protocol client to receive a time of day data and frequency information from a precision time protocol server, receive a timing signal from a global positioning system, synchronize the time of day data and the timing signal to create a synchronized time of day signal, and provide the synchronized time of day signal and the frequency information to a pseudowire device; and
  direct a processor in the pseudowire device to process the synchronized time of day signal and the frequency information to perform a time-division multiplexing signal to Ethernet signal conversion.

* * * * *